(12) United States Patent
Seo et al.

(10) Patent No.: US 10,126,602 B2
(45) Date of Patent: Nov. 13, 2018

(54) CURVED DISPLAY DEVICE AND FABRICATING METHOD THEREOF

(71) Applicant: Samsung Display Co., Ltd., Yongin (KR)

(72) Inventors: BongSung Seo, Suwon-si (KR); Sejoon Oh, Suwon-si (KR); Junwoo Lee, Seongnam-si (KR); Baekkyun Jeon, Yongin-si (KR); Su Jeong Kim, Seoul (KR); SuWan Woo, Osan-si (KR); Wan-Soon Im, Cheonan-si (KR); Yongwoo Hyung, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 96 days.

(21) Appl. No.: 14/663,172

(22) Filed: Mar. 19, 2015

(65) Prior Publication Data

US 2015/0268515 A1 Sep. 24, 2015

(30) Foreign Application Priority Data

Mar. 20, 2014 (KR) .................. 10-2014-0032888
Mar. 20, 2014 (KR) .................. 10-2014-0032889

(51) Int. Cl.
*G02F 1/1337* (2006.01)
*G02F 1/1362* (2006.01)

(52) U.S. Cl.
CPC .. *G02F 1/133788* (2013.01); *G02F 1/133753* (2013.01); *G02F 1/136209* (2013.01); *G02F 2001/133742* (2013.01); *G02F 2001/133746* (2013.01); *G02F 2001/133757* (2013.01); *G02F 2001/136218* (2013.01); *G02F 2001/136222* (2013.01)

(58) Field of Classification Search
CPC ........ G02F 2001/133742; G02F 2001/133746; G02F 2001/133757; G02F 2001/136218; G02F 2001/136222; G02F 1/13378; G02F 1/133753; G02F 1/136209; G02F 1/1337; G02F 1/133305; G02F 1/133788; G06F 1/1652; G09G 2380/02
USPC ........ 349/110, 123, 124, 129, 130, 158, 160
See application file for complete search history.

(56) References Cited

U.S. PATENT DOCUMENTS

| | | | |
|---|---|---|---|
| 5,838,407 A | 11/1998 | Chigrinov et al. | |
| 6,091,471 A | 7/2000 | Kim et al. | |
| 6,141,074 A | 10/2000 | Bos et al. | |
| 6,853,435 B2 | 2/2005 | Tanaka et al. | |
| 8,077,279 B2 | 12/2011 | Terashita et al. | |
| 2009/0015747 A1* | 1/2009 | Nishizawa | G02F 1/133308 349/58 |
| 2009/0237604 A1 | 9/2009 | Nagae | |

(Continued)

FOREIGN PATENT DOCUMENTS

| | | |
|---|---|---|
| JP | H11133429 | 5/1999 |
| JP | 2008181140 | 8/2008 |

(Continued)

*Primary Examiner* — Angela Davison
(74) *Attorney, Agent, or Firm* — H.C. Park & Associates, PLC

(57) ABSTRACT

A curved display device including a plurality of pixels that may be bent in a first direction crossing a second direction. The curved display device may include first and second substrates facing each other, and a liquid crystal layer interposed between the first and second substrates.

15 Claims, 17 Drawing Sheets

(56) References Cited

U.S. PATENT DOCUMENTS

| | | | |
|---|---|---|---|
| 2011/0051059 A1* | 3/2011 | Kang | C08F 220/06 349/110 |
| 2011/0134382 A1 | 6/2011 | Miyakawa et al. | |
| 2012/0113371 A1* | 5/2012 | Sohn | G02F 1/133788 349/124 |
| 2012/0212691 A1 | 8/2012 | Miyakawa et al. | |
| 2012/0218500 A1 | 8/2012 | Nakamura et al. | |
| 2012/0236238 A1 | 9/2012 | Kim et al. | |
| 2012/0301983 A1* | 11/2012 | Kang | G02F 1/133753 438/30 |
| 2013/0128200 A1 | 5/2013 | Shin et al. | |
| 2013/0182204 A1 | 7/2013 | Shin et al. | |
| 2014/0016057 A1* | 1/2014 | Tsai | G02F 1/136209 349/43 |
| 2015/0002800 A1* | 1/2015 | Tashiro | G02F 1/134309 349/124 |
| 2015/0029449 A1 | 1/2015 | Woo et al. | |

FOREIGN PATENT DOCUMENTS

| | | |
|---|---|---|
| JP | 2007225962 | 9/2011 |
| KR | 1020080026827 | 3/2008 |
| KR | 10-0928483 | 11/2009 |
| KR | 1020100072682 | 7/2010 |
| KR | 1020110055431 | 5/2011 |
| KR | 1020120090752 | 8/2012 |
| KR | 1020130057177 | 5/2013 |
| KR | 1020130059758 | 6/2013 |
| KR | 10-2015-0014197 | 2/2015 |

* cited by examiner

CURVED DISPLAY DEVICE AND FABRICATING METHOD THEREOF

CROSS-REFERENCE TO RELATED APPLICATIONS

This application claims priority from and the benefit of Korean Patent Application No. 10-2014-0032888, filed on Mar. 20, 2014, and Korean Patent Application No. 10-2014-0032889, filed on Mar. 20, 2014, which are both hereby incorporated by reference for all purposes as if fully set forth herein.

BACKGROUND

Field

Exemplary embodiments relate to a curved display device and a method of fabricating the same.

Discussion of the Background

A liquid crystal display (LCD) panel includes two transparent substrates and a liquid crystal layer therebetween. The liquid crystal layer may be controlled to adjust optical transmittance of each pixel to thereby display a desired image.

For a vertical-alignment (VA) mode LCD panel, when an electric field is applied to the liquid crystal layer, liquid crystal molecules in the liquid crystal molecules are aligned normal to the substrates, and this allows image light to be transmitted through the liquid crystal layer in the VA mode. For the VA mode, the LCD panel may include liquid crystal domains, each of which is configured to align the liquid crystal molecules therein in a specific direction, and the presence of such liquid crystal domains may contribute to improvement in the viewing angle characteristics of the LCD panel. For an in-plane switching (IPS) mode LCD panel, when an electric field is applied to the liquid crystal layer, liquid crystal molecules in the liquid crystal molecules are aligned parallel to the substrates, and this allows image light to be transmitted through the liquid crystal layer in the IPS mode.

Recently, a variety of studies have been conducted to develop a curved display panel provided with a curved display region providing an image with improved stereoscopic and immersion effects to a user.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a curved display panel with improved display quality and a method of fabricating the same.

Additional aspects will be set forth in the detailed description which follows, and, in part, will be apparent from the disclosure, or may be learned by practice of the inventive concept.

An exemplary embodiment of the present invention discloses a curved display device including a plurality of pixels, and is bent in a first direction crossing a second direction. The curved display device includes a first substrate including a first base substrate, a pixel electrode provided on the first base substrate, and a first alignment layer disposed on the pixel electrode, the first alignment layer including at least two domains having different photo-alignment directions, a second substrate including a second base substrate facing the first base substrate, a common electrode disposed on the second base substrate, and a second alignment layer disposed on the common electrode, the second alignment layer having a vertical alignment direction, and a liquid crystal layer including liquid crystal molecules interposed between the first and second substrates.

An exemplary embodiment of the present invention also discloses a method of fabricating a curved display device bent in a first direction, including: forming a pixel electrode on a first base substrate, forming a first alignment layer on the pixel electrode, forming a first alignment layer including at least two domains with different photo-alignment directions, forming a common electrode on a second base substrate, forming a second alignment layer having a vertical alignment direction on the common electrode, and forming a liquid crystal layer between the first and second alignment layers.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
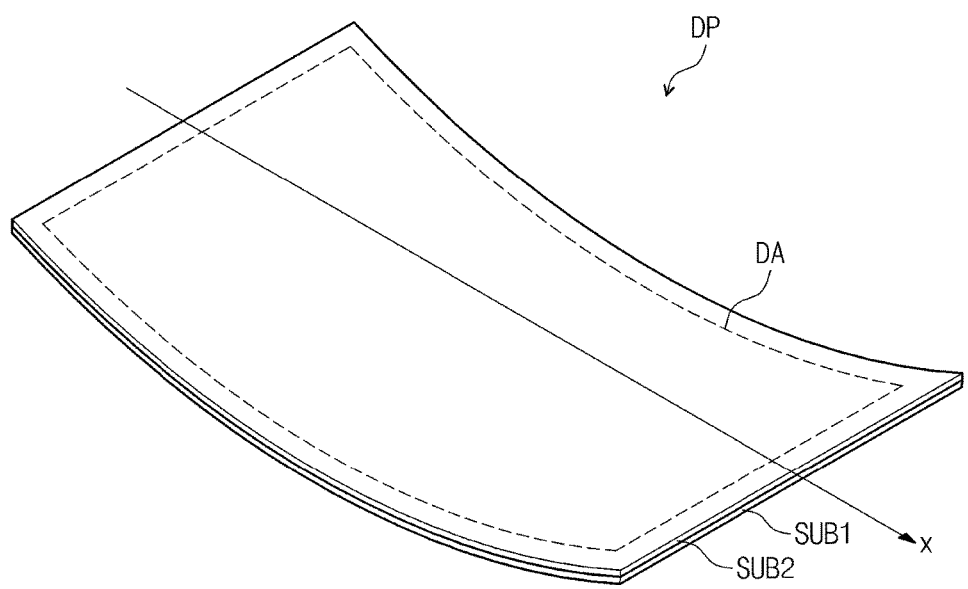
FIG. 1A is a perspective view of a curved display device according to exemplary embodiments of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
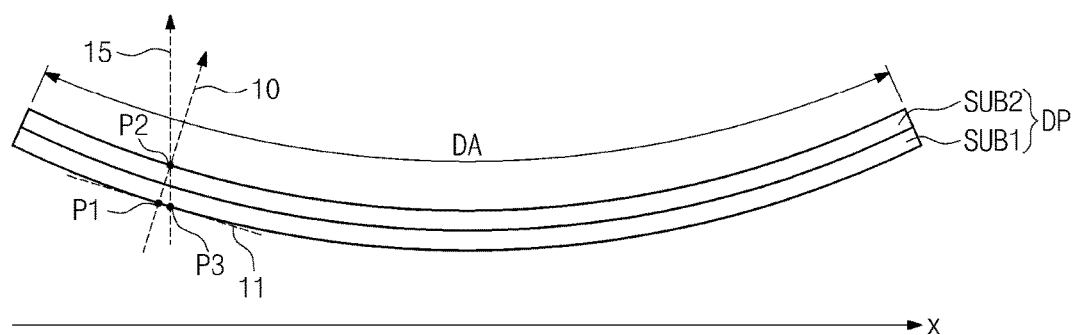
FIG. 1B is a sectional view of the curved display device shown in FIG. 1A.

FIG. 1A is a perspective view of a curved display device according to exemplary embodiments of the inventive concept, and FIG. 1B is a sectional view of the curved display device shown in FIG. 1A. In exemplary embodiments of the inventive concept, the curved display device may have a rectangular shape with a pair of long sides and a pair of short sides. However, the shape of the curved display device is not so limited, and may be rectangular, polygonal, or circular. Further, a bending direction of the curved display device may be changed if necessary. In the present exemplary embodiment, a direction of the long side of the curved display device will be referred to as an "x-axis direction", for convenience in description.

Referring to FIG. 1A, a curved display device DP may be bent in the x-axis direction. More specifically, the curved display device DP may be configured to have a curved profile when viewed by a user, and thereby, to allow the user to see an image to be displayed on a curved screen (i.e., a display region DA). Hereinafter, the curved display device DP means a display device, in which the display region DA with the curved profile is provided. When the curved display device DP is used to display images, it is possible to improve sensations of stereoscopy, flow, and reality in the images perceived by the user.

The curved display device DP may include a first substrate SUB1, a second substrate SUB2 facing the first substrate SUB1, and a liquid crystal layer (not shown) interposed between the first and second substrates SUB1 and SUB2.

The first and second substrates SUB1 and SUB2 may have a shape that bends in the x-axis direction. The first substrate SUB1 may be partially or wholly bent in a continuous manner along the x-axis direction, and thus, the display region DA may be curved in the x-axis direction. The second substrate SUB2 may be bent along with the first substrate SUB1.

Referring to FIG. 1B, in the case where the first and second substrates SUB1 and SUB2 have the curved shape, a normal line 10, which is normal to a tangent line 11 on a first position P1 of the second substrate SUB2, may pass through a specific point of the first substrate SUB1 (hereinafter, referred to as a second position P2). However, a viewing line 15, which is parallel to a viewing direction connecting from the second position P2 to the user's eye, may pass through a third position P3 of the second substrate SUB2 that is different from the first position P1.

A distance from the first position P1 to the third position P3 may be changed depending on a curvature of the curved display device DP. For example, the greater the curvature of the curved display device DP, the greater the distance between the first and third positions P1 and P3.

When the first and third positions P1 and P3 are spaced apart from each other by a finite distance, the first and second substrates SUB1 and SUB2 are said to be "misaligned" with each other. A way for preventing a failure resulting from the misalignment (for example, a texture defect) will be described below.

Figure 2:
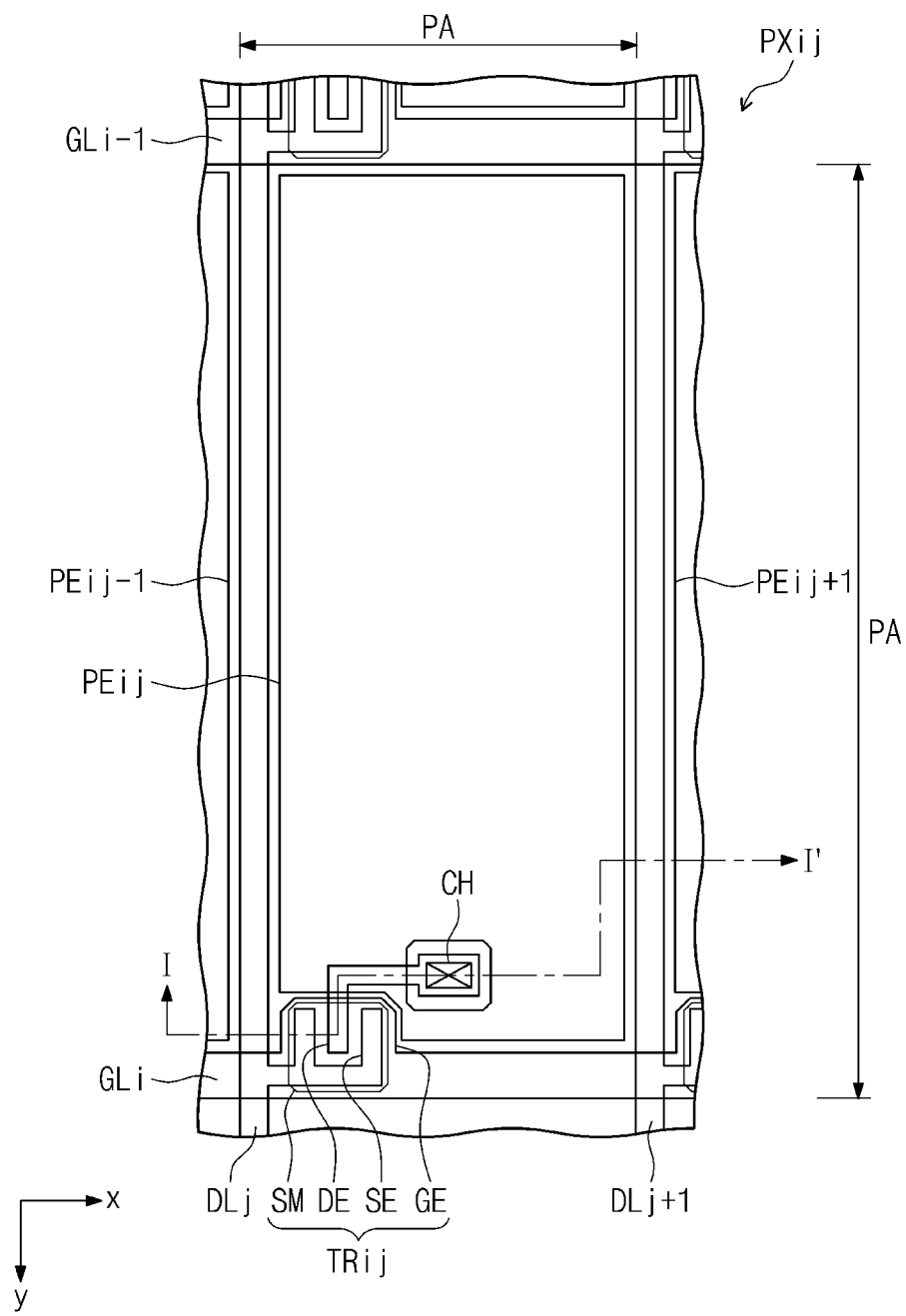
FIG. 2 is a plan view illustrating a first substrate according to exemplary embodiments of the inventive concept.
Figure 3:
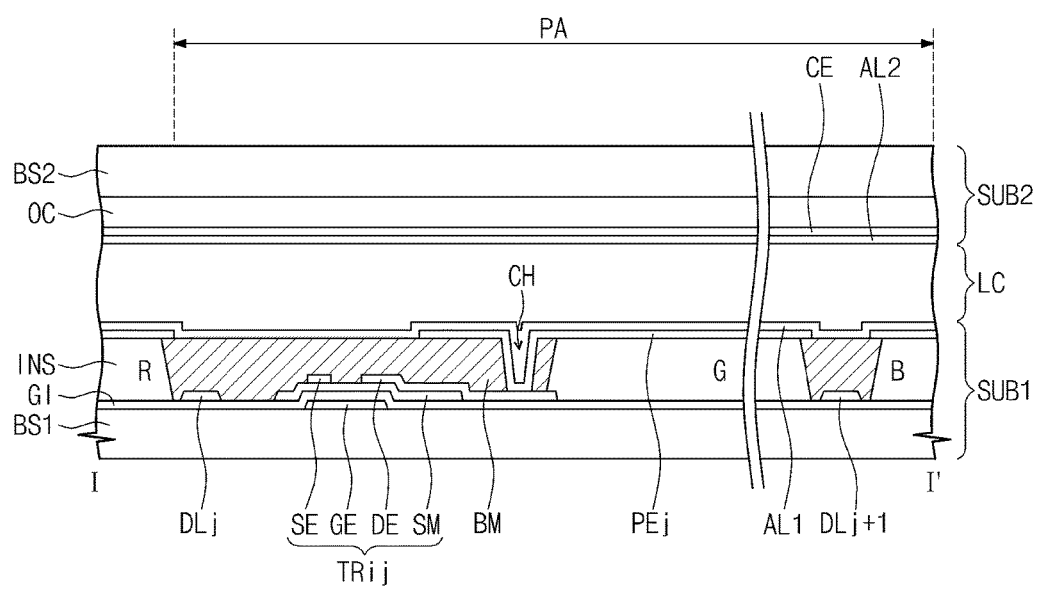
FIG. 3 is a sectional view taken along a line I-I' of FIG. 2.

FIG. 2 is a plan view illustrating a first substrate SUB1 according to exemplary embodiments of the inventive concept, and FIG. 3 is a sectional view taken along a line I-I' of FIG. 2.

Referring to FIGS. 2 and 3, a curved display device includes the first substrate SUB1, the second substrate SUB2, and a liquid crystal layer LC interposed between the first substrate SUB1 and the second substrate SUB2.

The curved display device may include a plurality of pixels PX, which may be provided in a plurality of pixel regions PA arranged in the form of a matrix. For the sake of illustration, one of the pixel regions PA for a pixel PXij positioned at i-th row and j-th column is exemplarily illustrated in FIGS. 2, 3A, and 3B. Hereinafter, in the reference numerals, the index i denotes a row index, and the index j denotes a column index. The pixel regions PA may have the same structure, and thus, for concise description, one of the pixel regions PA will be described as an example of the pixel regions PA. Although the pixel region PA is illustrated to have a rectangular shape elongated along a specific direction, the inventive concept is not limited thereto. The pixel region PA may have one of various shapes (e.g., 'V' or 'Z'-like shapes).

The first substrate SUB1 may include a first base substrate BS1, a gate line GL, a data line DL, a thin-film transistor TRij, a pixel electrode PE, and a first alignment layer AL1.

The first base substrate BS1 may be formed of an insulating material having some degree of flexibility.

In exemplary embodiments, a plurality of gate lines GL may be provided on the first base substrate BS1 to extend along a specific direction. FIG. 2 illustrates (i−1)-th and i-th gate lines, GLi−1 and GLi, of the gate lines GL, and hereinafter, the (i−1)-th and i-th gate lines GLi−1 and GLi will be referred to as first and second gate lines GLi−1 and GLi.

In exemplary embodiments, a plurality of data lines DL may be provided on the first base substrate BS1, and may be electrically isolated from the gate line GL by a gate insulating layer GI to extend along another direction crossing the gate lines GL. FIG. 2 illustrates j-th and (j+1)-th data lines, DLj and DLj+1, of the data lines DL, and hereinafter, the j-th and (j+1)-th data lines DLj and DLj+1 will be referred to as first and second data lines DLj and DLj+1.

The thin-film transistor TRij may be electrically connected to the second gate line GLi and first data line DLj to control a switching operation of selectively supplying a signal to a pixel electrode PEij. In detail, the thin-film transistor TRij may include a gate electrode GE diverging from the second gate line GLi, a source electrode SE diverging from the first data line DLj, and a drain electrode DE electrically connected to the pixel electrode PEij. A semiconductor pattern SM may be provided between the source and drain electrodes SE and DE, and may be used as a channel region of the thin-film transistor TRij.

An insulating layer INS may be provided on the thin-film transistor TRij. The insulating layer INS may be provided to correspond to the pixel regions PA. The insulating layer INS may include color pixels and a black matrix BM between the color pixels.

Each of the color pixels may be one of red, green, and blue color pixels R, G, and B, and may be or further include at least one additional color pixel, such as magenta, yellow, and cyan color pixels.

The black matrix BM may be configured to block light transmitted from the liquid crystal layer LC. The black matrix BM may be provided to cover the first and second gate lines GLi−1 and GLi, the first and second data lines DLj and DLj+1, and the thin-film transistor TRij.

The pixel electrode PEij may be connected to the second gate line GLi and the first data line DLj through the thin-film transistor TRij. The pixel electrode PEij may be provided on the pixel region PA. The pixel electrode PEij may be provided on the insulating layer INS and may be connected to the drain electrode DE of the thin-film transistor TRij through a contact hole CH.

Figure 4A:
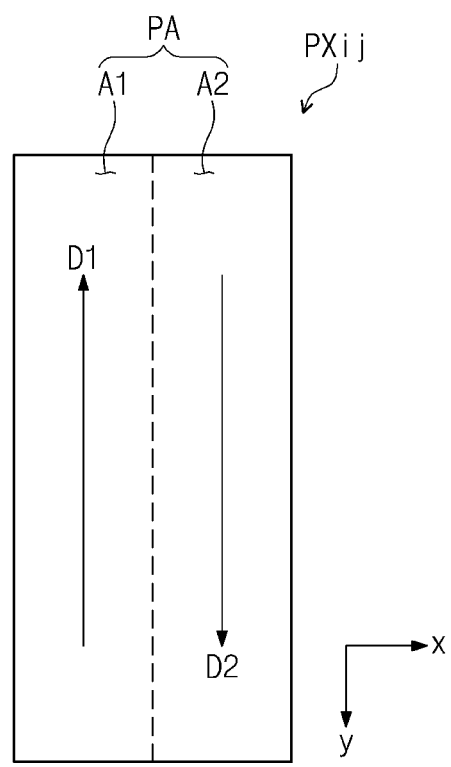
FIG. 4A, FIG. 4B, and FIG. 4C are plan views schematically illustrating a photo-alignment method for controlling a first alignment layer in such a way that domains thereof have different alignment directions, according to exemplary embodiments of the inventive concept.

The pixel electrode PEij may be spaced apart from other pixel electrodes (for example, a left pixel electrode PEij−1 and a right pixel electrode PEij+1) in a first direction D1 in FIG. 4A, and may be electrically separated from them.

In exemplary embodiments of the inventive concept, the pixel electrode PEij may be provided in the form of plate. However, the shape of the pixel electrode PEij may not be limited thereto. For example, the pixel electrode PEij may include a trunk portion and a plurality of branch portions radially extending from the trunk portion. The trunk portion may be provided in the form of a cross, and the plurality of branch portions may be provided parallel to and spaced apart from each other, in a region sectioned by the trunk portion. The branch portions adjacent to each other may be spaced apart from each other by a micrometer-order distance to form a plurality of fine slits.

The first alignment layer AL1 may be provided on the pixel electrode PEij to align liquid crystal molecules of the liquid crystal layer LC to at least two different alignment directions or in a pretilt angle. The pretilt angle means an angle between a top surface of the first substrate SUB1 or the first alignment layer AL1 and the liquid crystal molecules, and the alignment direction means a tilting direction of the liquid crystal molecules. In the case where the first alignment layer AL1 is aligned by a photo alignment, a direction of the liquid crystal molecules adjacent to the first alignment layer AL1 may be the same as a direction of the photo alignment.

The first alignment layer AL1 may include a photosensitive organic or inorganic polymer material. The material for the alignment layer may be or include a polymer material (e.g., polyimide or polyamic acid), in which light polymerization, photoisomerization, or photolysis reaction occurs when exposed by light. However, the material for the first alignment layer will not be limited thereto, and it may be or include polynorbornene phenyl maleimide copolymer, polyvinylcinnamate, polyazobenzene, polyethyleneimine, polyvinylalcohol, polyamide, polyethylene, polystyrene, polyphenylenephthalamide, polyester, polyurethane, or polymethylmethacrylate. Further, the alignment material for the photo alignment is not limited to an organic polymer material. For example, the alignment material may be or include an inorganic polymer (e.g., polysiloxane).

Figure 4B:
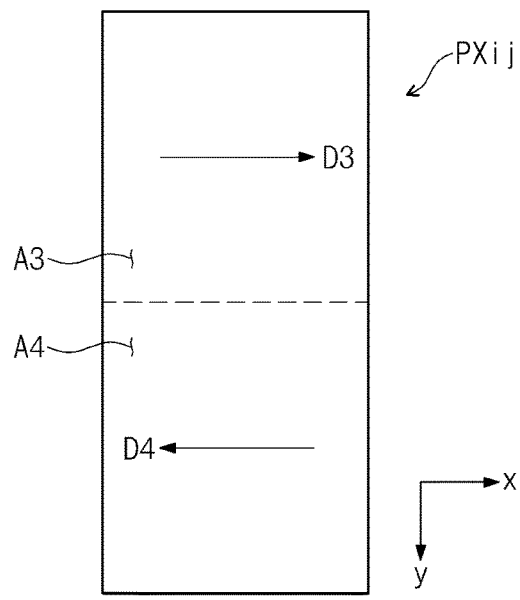
Figure 4C:
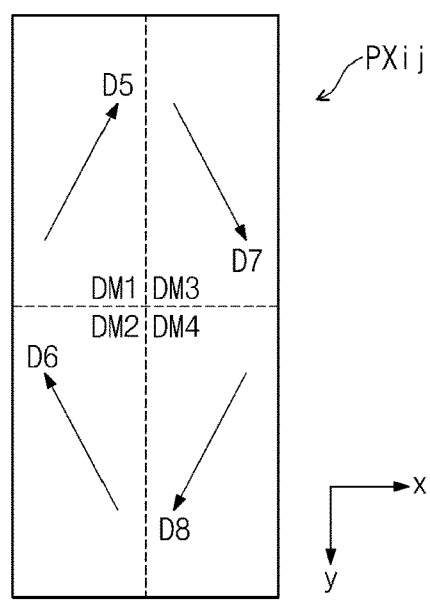

In exemplary embodiments, the first alignment layer AL1 may include a plurality of domains having different alignment directions. FIGS. 4A through 4C are plan views schematically illustrating a photo-alignment method for controlling a first alignment layer in such a way that domains thereof have different alignment directions, according to exemplary embodiments of the inventive concept. Hereinafter, the photo alignment of the first alignment layer will be described with reference to FIGS. 4A through 4C. For the sake of simplicity, the description of FIGS. 4A through 4C will refer to an example of the present exemplary embodiment in which the first alignment layer includes first to fourth domains DM1, DM2, DM3, and DM4 with different photo-alignment directions.

Referring to FIG. 4A, a first exposure may be performed to the first alignment layer. In the first exposure, the pixel region PA of each pixel PXij may be sectioned into first and second regions A1 and A2, which are exposed along the y-axis direction by exposure steps along two different directions. For example, the first alignment layer on the first region A1 may be photo-aligned in a first direction D1, and the first alignment layer on the second region A2 may be photo-aligned in a second direction D2 that is opposite to the first direction D1.

Referring to FIG. 4B, a second exposure may be performed to the first alignment layer. In the second exposure, the pixel region PA of each pixel PXij may be sectioned into third and fourth regions A3 and A4, which are exposed along the x-axis direction by exposure steps along two different directions. For example, the first alignment layer on the third region A3 may be photo-aligned in a third direction D3, and the first alignment layer on the fourth region A4 may be photo-aligned in a fourth direction D4.

Referring to FIG. 4C, the first alignment layer may be twice photo-aligned along the first and third directions D1 and D3 on an overlapped region between the first and third regions A1 and A3 (hereinafter, referred to as the first domain DM1). Thus, on the first domain DM1, the first alignment layer may be photo-aligned to a fifth direction D5, which is given by a vector sum of the first and third directions D1 and D3. The first alignment layer may be twice photo-aligned along the first and fourth directions D1 and D4 on an overlapped region between the first and fourth regions A1 and A4 (hereinafter, referred to as the second domain DM2). Thus, on the second domain DM2, the first alignment layer may be photo-aligned to a fifth direction D6, which is given by a vector sum of the first and fourth directions D1 and D4. The first alignment layer may be twice photo-aligned along the second and third directions D2 and D3 on an overlapped region between the second and third regions A2 and A3 (hereinafter, referred to as the third domain DM3). Thus, on the third domain DM3, the first alignment layer may be photo-aligned to a seventh direction D7, which is given by a vector sum of the second and third directions D2 and D3. The first alignment layer may be twice photo-aligned along the second and fourth directions D2 and D4 on an overlapped region between the second and fourth regions A2 and A4 (hereinafter, referred to as the fourth domain DM4). Thus, on the fourth domain DM4, the first alignment layer may be photo-aligned to an eighth direction D8, which is given by a vector sum of the second and fourth directions D2 and D4.

In exemplary embodiments, for each pixel PXij, the first to fourth domains DM1, DM2, DM3, and DM4 may be configured to have clockwise photo-alignment directions.

In each of the first to fourth domains DM1, DM2, DM3, and DM4, the liquid crystal molecules may have a pretilt angle ranging from 85° to 89.5°. Alternatively, in each of the first to fourth domains DM1, DM2, DM3, and DM4, the liquid crystal molecules may have a pretilt angle of about 88.2°±0.2°. In exemplary embodiments, in each of the first to fourth domains DM1, DM2, DM3, and DM4, the liquid crystal molecules may have a pretilt angle (hereinafter, referred to as a "first angle $\theta_1$,") ranging from 88.3° to 89.2°. In this case, when light is incident into the first alignment layer AL1, an incident angle of the light may be at an angle to the top surface of the first substrate SUB1 or the first alignment layer AL1. In some exemplary embodiments, the incident angle of the light may be variously changed.

The first to fourth domains DM1, DM2, DM3, and DM4 may be formed by the photo-alignment process. The photo-alignment process may include providing an incident light at a slant direction to the first alignment layer AL1, which is formed on the pixel electrode PEij. The incident light may be ultraviolet light, and may be polarized.

When the light is incident onto the first alignment layer AL1, the incident angle of the light may be at an angle to the top surface of the first substrate SUB1 or the first alignment layer AL1. In exemplary embodiments, the incident angle may range from 1° to 89°. The incident angle of the light may be variously changed. In other exemplary embodiments, the incident angle may range from about 40° to about 45°.

In exemplary embodiments, an alignment degree in the photo-alignment process may be changed depending on exposure doses of the first and second exposure processes (hereinafter, referred as to first and second exposure doses, respectively). Thus, by controlling the first and second exposure doses, it is possible to achieve a desired alignment degree in the photo-alignment process. In exemplary embodiments, a ratio of the first exposure dose to the second exposure dose may be from about 1:1 to about 5:1. In other exemplary embodiments, the ratio of the first exposure dose to the second exposure dose may be about 3:1.

Figure 5:
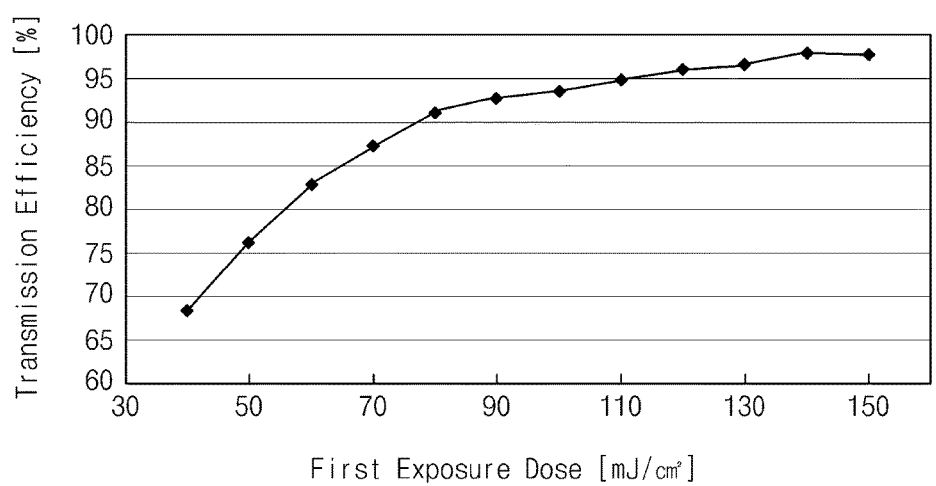
FIG. 5 is a graph showing transmission efficiency of each pixel measured when a second exposure dose is fixed and a first exposure dose is changed.

FIG. 5 is a graph showing transmission efficiency of each pixel measured when a second exposure dose is fixed and a first exposure dose is changed. In the graph of FIG. 5, the second exposure dose was constantly maintained at 50 mJ/cm$^2$.

Referring to FIG. 5, when the first exposure dose was lower than 50 mJ/cm$^2$, transmission efficiency was about 75% or less. The higher the first exposure dose, the greater the transmission efficiency. Especially, when the first exposure dose was 150 mJ/cm$^2$, the transmission efficiency was about 98% or greater. When the first exposure dose was higher than the second exposure dose, the photo-alignment process was performed more efficiently than when the first and second exposure doses were the same. This result shows that the transmission efficiency can be effectively increased when the liquid crystal molecules are photo-aligned in a specific direction or have a specific photo-alignment angle. Accordingly, in exemplary embodiments, the first exposure dose may be higher than the second exposure dose. As an example, the ratio of the first exposure dose to the second exposure dose may be about 3:1. As another example, the ratio of the first exposure dose to the second exposure dose may be about 5:1.

As a result, liquid crystal molecules in the first to fourth domains DM1, DM2, DM3, and DM4 may be arranged to have fifth to eighth directions D5, D6, D7, and D8, respectively, that are different from each other. In exemplary embodiments, as shown in FIG. 4C, the first to fourth domains DM1, DM2, DM3, and DM4 may be configured to have clockwise alignment directions. Because the plurality of domains DM1, DM2, DM3, and DM4 are formed to have different alignment directions, the curved display device can have an increased viewing angle.

Figure 6A:
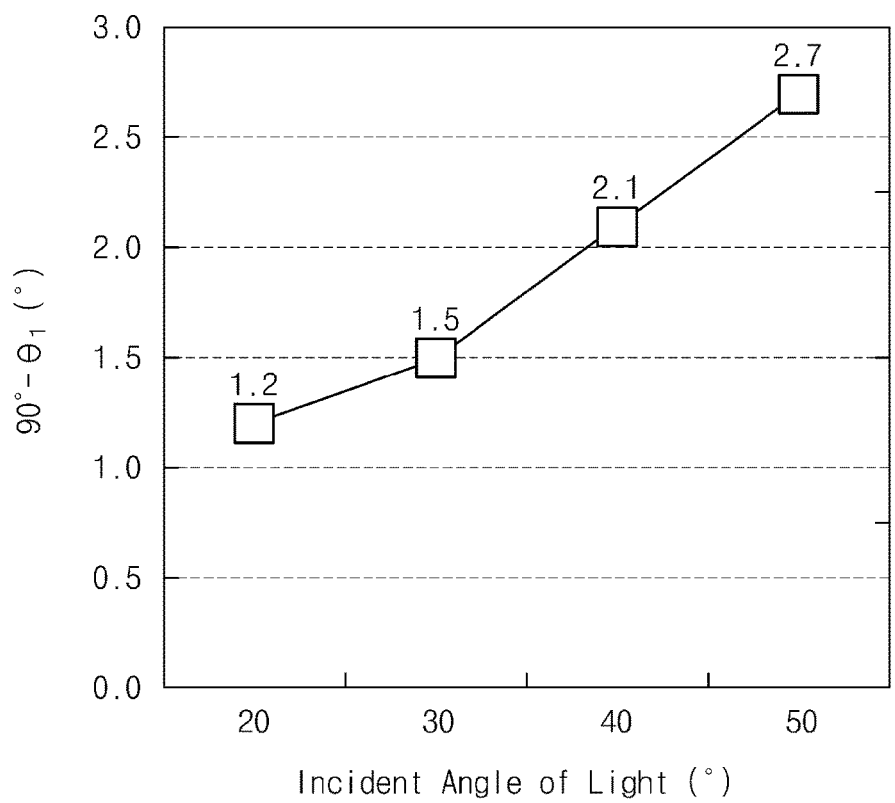
FIG. 6A is a graph showing a pretilt angle property measured when an angle of irradiation light is changed in a photo-alignment process of a first alignment layer.

FIG. 6A is a graph showing a pretilt angle property measured when an angle of irradiation light is changed in a photo-alignment process of a first alignment layer. In the graph of FIG. 6A, the y-axis represents an angle obtained by subtracting the first angle $\theta_1$ from 90°.

Referring to FIG. 6A, the y value (i.e., 90°−$\theta_1$) increased as the incident angle of light increased. Accordingly, the incident angle can be calculated from the y value given by 90°−$\theta_1$.

In exemplary embodiments, the irradiation dose of the incident light may be varied.

Figure 6B:
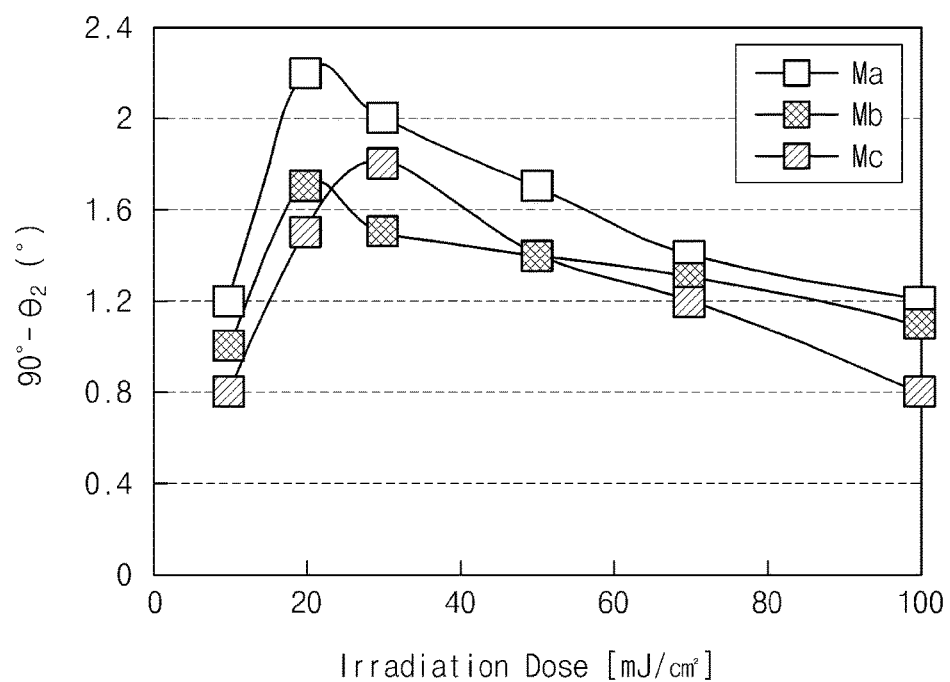
FIG. 6B is a graph showing a pretilt angle property according to optical materials measured when an irradiation dose of irradiation light is changed in the photo-alignment process of the first alignment layer.

FIG. 6B is a graph showing a pretilt angle property according to optical materials measured when an irradiation dose is changed in the photo-alignment process of the first alignment layer. In the graph of FIG. 6B, the y-axis represents an angle obtained by subtracting the first angle $\theta_1$ from 90°. In FIG. 6B, although alignment materials (denoted by reference letters Ma, Mb, and Mc) were different from each other, the curves thereof had a shape similar to each other. The curves of FIG. 6B show that an irradiation dose suitable for realizing the pretilt angle of the first angle is about 20 mJ/cm² or lower. Even in the case that the irradiation dose is higher than about 60 mJ/cm², a desired pretilt angle can be realized, but this arrangement results in an increase in energy consumption.

Referring back to FIGS. 2 and 3, the second substrate SUB2 may be provided to face the first substrate SUB1. The second substrate SUB2 may include a second base substrate BS2, an over-coat layer OC, a common electrode CE, and a second alignment layer AL2.

The second base substrate BS2 may be formed of an insulating material having flexibility.

The over-coat layer OC may be provided to cover the second base substrate BS2. In some exemplary embodiments, the over-coat layer OC may be omitted.

The common electrode CE may be provided on the over-coat layer OC to produce an electric field along with the pixel electrode PE. In exemplary embodiments, the common electrode CE may be formed to have a plate-shaped structure. However, the shape of the common electrode CE may not be limited to a specific shape. For example, in some exemplary embodiments, the common electrode CE may be patterned to have at least one opening.

The second alignment layer AL2 may be provided on the common electrode CE, and may be a vertical alignment layer, to which a photo-alignment process cannot be effectively applied. In other words, the second alignment layer may not have different alignment directions. Further, the second alignment layer may be configured to realize a pretilt angle of about 90° relative to a top surface thereof.

The second alignment layer AL2 may include a polymer material, such as polyimide or polyamic acid. However, the material for the second alignment layer AL2 is not limited thereto, and may be the same or different from the material for the first alignment layer AL1.

In exemplary embodiments, the second alignment layer may be configured to have the pretilt angle that is different from that of the first alignment layer. In exemplary embodiments, a photo-alignment process may not be performed to the second alignment layer. Alternatively, a photo-alignment process may be additionally performed to realize a pretilt angle of about 90°. For example, a pretilt angle of the liquid crystal molecules resulting from the second alignment layer (hereinafter, referred as to a second angle $\theta_2$) may range from about 89.8° to about 90°.

According to exemplary embodiments of the inventive concept, the first and second angles may satisfy the following formula.

$$0.8° \leq \theta_2 - \theta_1 \leq 1.5°$$ [Formula]

The following is a description of the above formula.

In general, as described above, the curvature of the curved display device may lead to a misalignment problem of the curved display device. Especially, for the conventional curved LCD device, the misalignment between the first and second substrates may result in a decrease in transmittance of the curved display device, because of a difference between the pretilt and alignment directions of liquid crystal molecules. According to exemplary embodiments of the inventive concept, the first and second alignment layers may be configured to control the pretilt angles and to thereby compensate a reduction in transmittance of the curved LCD device. Generally, in the display device, a user can perceive a brightness change of about ±2%, and thus, the first and second alignment layers may be configured to compensate a transmittance change ranging from about −2% to about 2%. According to exemplary embodiments of the inventive concept, to compensate the transmittance reduction, the first and second angles $\theta_1$ and $\theta_2$ may be selected in a way such that a difference therebetween is within a specific range.

The following Table 1 shows transmittance and a change in brightness, which are caused by a difference between the first and second angles when the pretilt angles of the first and second alignment layers are changed by a photo-alignment process. Table 1 was obtained from simulation.

TABLE 1

| Pretilt angle (°) | | | Transmittance (arbitrary unit) | | Change in brightness (%) |
| --- | --- | --- | --- | --- | --- |
| First angle ($\theta_1$) | Second angle ($\theta_2$) | $\theta_2 - \theta_1$ | w/o misalignment | w/ misalignment (30 μm) | |
| 89.0 | 90.0 | 1.0 | 0.17072 | 0.17072 | 0% |
| 89.0 | 89.8 | 0.8 | 0.17191 | 0.16988 | −1.2% |
| 89.0 | 89.5 | 0.5 | 0.17339 | 0.16651 | −4.0% |
| 89.0 | 89.2 | 0.2 | 0.17459 | 0.1625 | −6.9% |
| 89.0 | 89.0 | 0.0 | 0.17527 | 0.15955 | −9.0% |

Referring to Table 1, when there was a misalignment and the value $\theta_2-\theta_1$ was greater than 0.8°, the change in brightness was about −1%. Accordingly, such a change in brightness cannot be perceived by a user. In the curved display device according to exemplary embodiments of the inventive concept, the value $\theta_2-\theta_1$ may be equal to or greater than 0.8°. Further, the value $\theta_2-\theta_1$ may be equal to or less than 1.5°, because when the value $\theta_2-\theta_1$ is greater than 1.5°, a response time of the liquid crystal molecules or a contrast ratio of the display device may be decreased.

The following Table 2 shows the presence or absence of a texture defect, which is perceived by human eyes, according to the difference between the first and second angles.

TABLE 2

| Pretilt angle (°) | | | Presence or absence of texture defect | |
|---|---|---|---|---|
| First angle ($\theta_1$) | Second angle ($\theta_2$) | $\theta_2 - \theta_1$ | w/o misalignment | w/ misalignment (30 μm) |
| 89.0 | 90.0 | 1.0 | X | X |
| 89.0 | 89.8 | 0.8 | X | X |
| 89.0 | 89.5 | 0.5 | X | ◯ |
| 89.0 | 89.2 | 0.2 | X | ◯ |
| 89.0 | 89.0 | 0.0 | X | ◯ |

Referring Table 2, when the value $\theta_2-\theta_1$ was greater than 0.8°, there was no texture defect.

The liquid crystal layer LC may include liquid crystal molecules having dielectric anisotropy and optical anisotropy. In exemplary embodiments, the liquid crystal layer LC may include liquid crystal molecules having negative dielectric anisotropy. Orientation of the liquid crystal molecules in the liquid crystal layer LC may be controlled by an electric field produced between the pixel electrode PEij and the common electrode CE. For example, the orientation of the liquid crystal molecules in the liquid crystal layer LC may be changed by controlling a magnitude of the electric field, and such a change in the orientation of the liquid crystal molecules may lead to a change in transmittance of the display device. The magnitude of the electric field applied to the liquid crystal molecules may be controlled by common and data voltages applied to the common electrode CE and the pixel electrode PEij, respectively.

In exemplary embodiments, a backlight assembly (not shown) may be disposed on a back side of the first substrate SUB1 to provide light toward the liquid crystal layer LC.

According to exemplary embodiments of the inventive concept, the curved display device may be configured in such a way that each pixel region thereof has at least two domains with different photo-alignment directions from each other. This makes it possible to realize an LCD panel with an increased viewing angle, compared with the case in which an LCD panel has a single domain.

In the curved display device with the afore-described structure, liquid crystal molecules in the first to fourth domains DM1, DM2, DM3, and DM4 may be arranged to have fifth to eighth directions D5, D6, D7, and D8, respectively, that are different from each other. In exemplary embodiments, as shown in FIG. 4C, the first to fourth domains DM1, DM2, DM3, and DM4 may be configured to have clockwise alignment directions. Because the domains DM1, DM2, DM3, and DM4 are formed to have different alignment directions, the curved display device can have an increased viewing angle.

Further, the curved display device with the afore-described structure may be free from a photo-alignment failure, which may be caused by the misalignment. The reason is as follows.

In the conventional display device, the first alignment layer of the first substrate and the second alignment layer of the second substrate are photo-aligned to have different alignment directions from each other, at a corresponding each pixel region, and then, the first and second substrates are combined in such a way that corresponding pixel regions face each other. In this case, a resultant photo-alignment direction may be given by a vector sum of the photo-alignment directions of the first and second alignment layers. However, for the conventional display device, each of the first and second substrates is disposed on a single plane and does not have a curved portion. Thus, the first and second substrates may be combined without the problems associated with the misalignment or the photo-alignment direction.

However, as a result of the curved profile of the display device shown in FIG. 1, there may be a misalignment between the first and second substrates SUB1 and SUB2, and such a misalignment may lead to a problem in that the liquid crystal molecules are photo-aligned in an unintended direction. Accordingly, the curved display device may suffer from various failures, such as, for example, a failure in texture.

In contrast, for the curved display device according to exemplary embodiments of the inventive concept, the first alignment layer of the first substrate may be configured to have a plurality of domains whose alignment directions are different from each other, and the second alignment layer of the second substrate may be configured to not have a specific alignment direction. Accordingly, the resultant alignment direction of the liquid crystal molecules may be mainly determined by the photo-alignment direction of the first alignment layer. As a result, it is possible to prevent a failure associated with the photo-alignment direction (for example, the texture defect) from occurring when the first and second substrates are combined with each other.

Further, for the curved display device according to exemplary embodiments of the inventive concept, the black matrix may be provided on or in the first substrate. This makes it possible to avoid the misalignment between the first and second substrates, which may occur when the black matrix is provided on or in the second substrate.

In the curved display device according to exemplary embodiments of the inventive concept, the photo-alignment direction of each domain may be variously changed from that of the previous exemplary embodiments. FIGS. 7A through 7D are plan views illustrating photo-alignment directions of first to fourth domains according to other exemplary embodiments of the inventive concept. According to exemplary embodiments of the inventive concept, there is no need to arrange the domains in a specific manner, but for the sake of simplicity, the following description of FIGS. 7A through 7D will refer to an example of the present embodiment in which the first to fourth domains are arranged in the same manner as those of the previous embodiments.

Referring to FIGS. 7A through 7D, the first to fourth domains DM1, DM2, DM3, and DM4 of each pixel PXij may be configured to have photo-alignment directions thereof different from those of the previous exemplary embodiments.

Figure 7A:
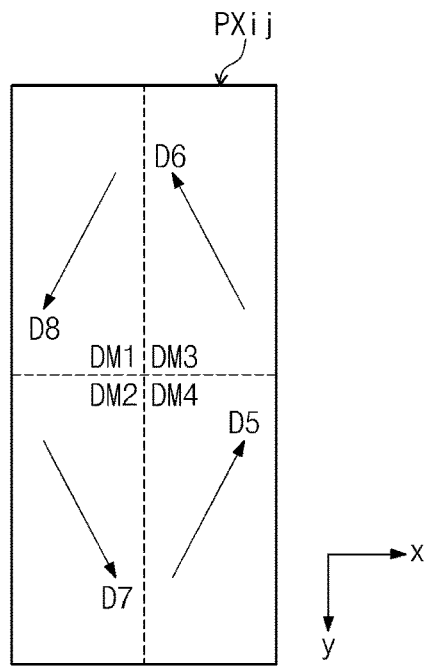
FIG. 7A, FIG. 7B, FIG. 7C, and FIG. 7D are plan views illustrating photo-alignment directions of first to fourth domains according to other exemplary embodiments of the inventive concept.

As shown in FIG. 7A, the first to fourth domains DM1, DM2, DM3, and DM4 of each pixel PXij may be configured to have counterclockwise photo-alignment directions.

Figure 7B:
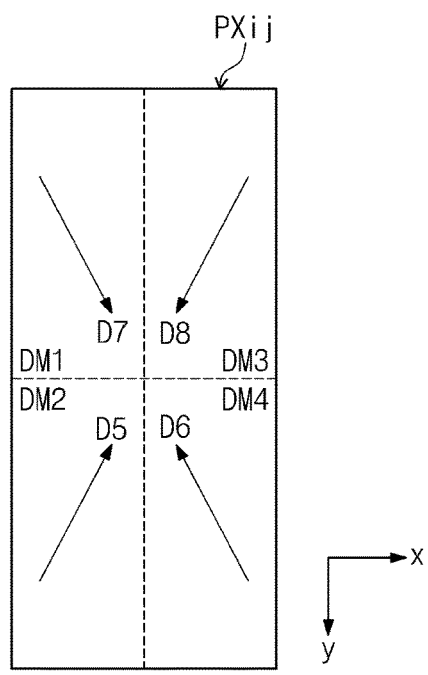
Figure 7C:
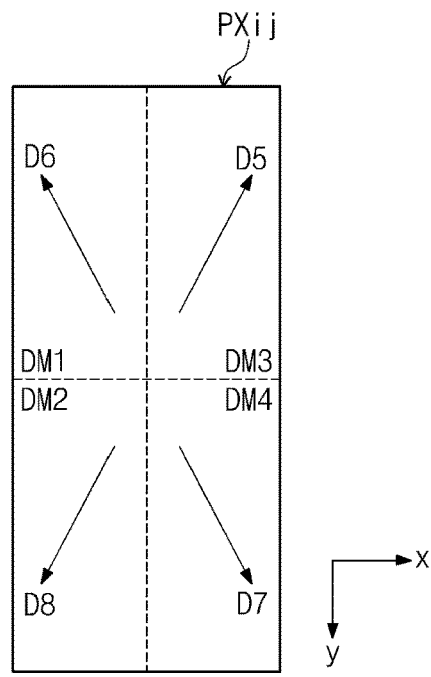

As shown in FIG. 7B, the first to fourth domains DM1, DM2, DM3, and DM4 of each pixel PXij may be configured to have photo-alignment directions, which are not clockwise or counterclockwise. For example, the first to fourth domains DM1, DM2, DM3, and DM4 of each pixel PXij may have photo-alignment directions, which are centripetally oriented toward a center of the pixel region of each pixel PXij. Alternatively, as shown in FIG. 7C, the first to fourth domains DM1, DM2, DM3, and DM4 of each pixel PXij may have photo-alignment directions, which are radially oriented away from the center of the pixel region of each pixel PXij.

Figure 7D:
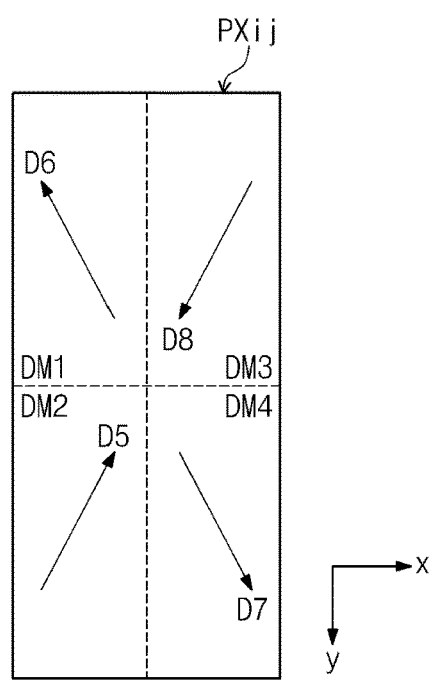
Figure 8A:
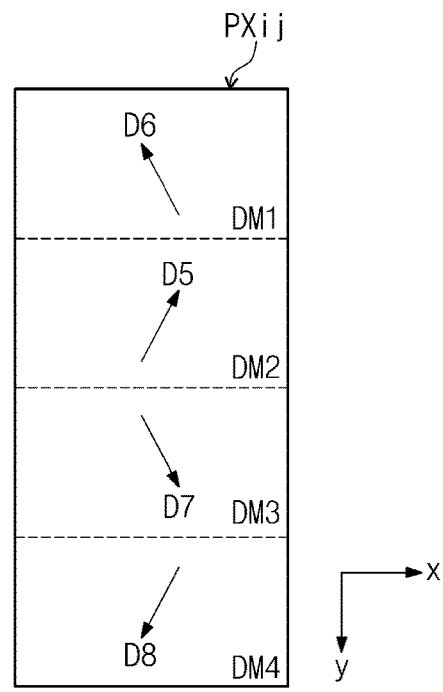
FIG. 8A, FIG. 8B, FIG. 8C, and FIG. 8D are plan views illustrating photo-alignment directions of first to fourth domains according to still other exemplary embodiments of the inventive concept.
Figure 8B:
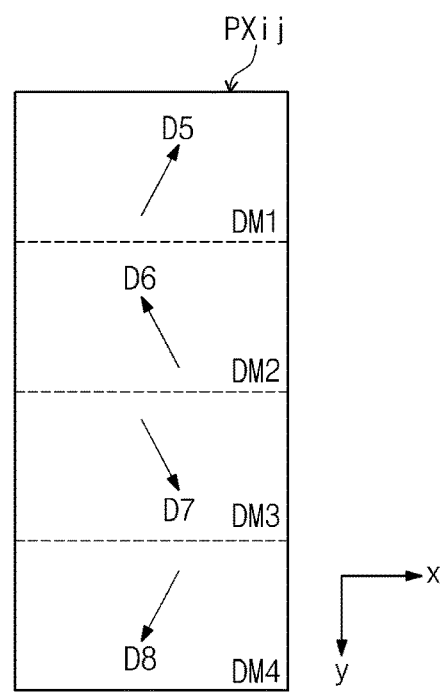
Figure 8C:
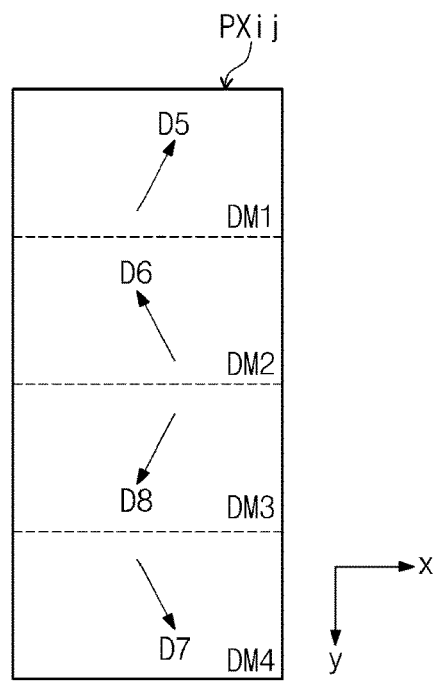
Figure 8D:
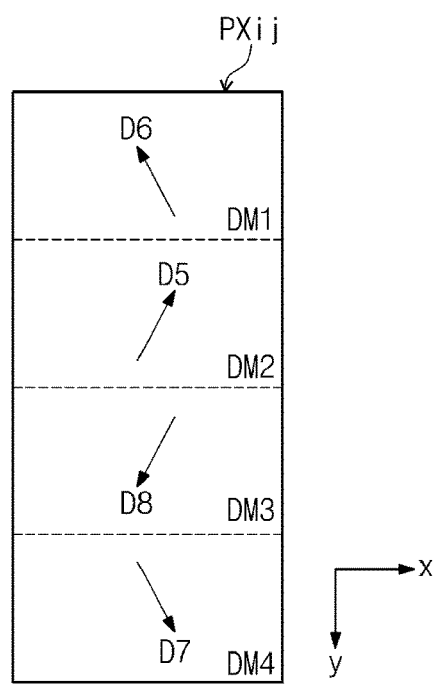
Figure 9A:
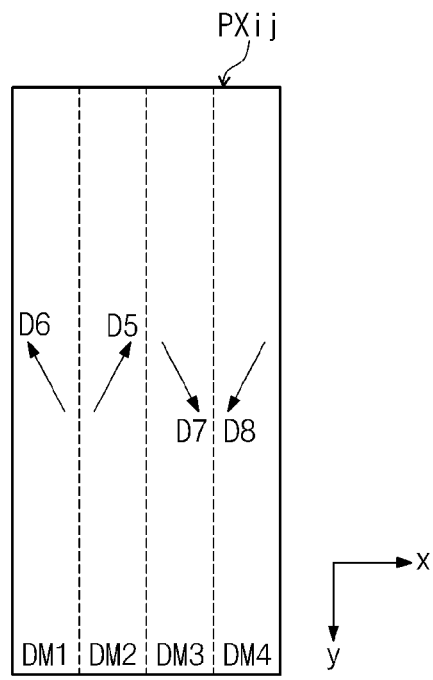
FIG. 9A, FIG. 9B, FIG. 9C, and FIG. 9D are plan views illustrating photo-alignment directions of first to fourth domains according to even other exemplary embodiments of the inventive concept.
Figure 9B:
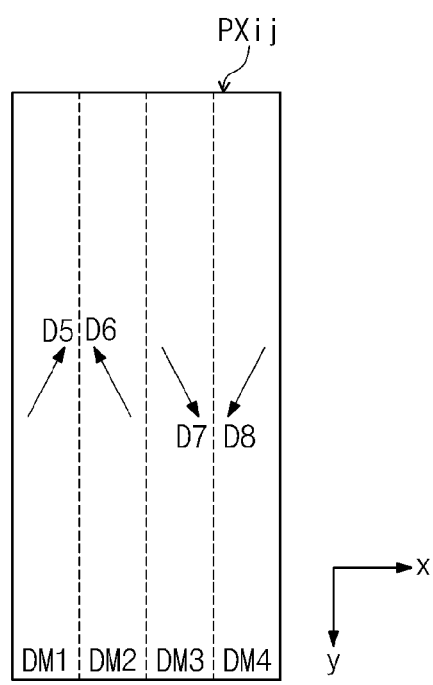
Figure 9C:
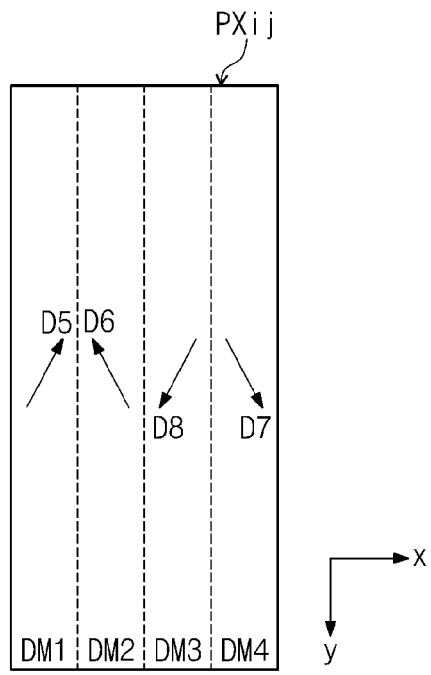
Figure 9D:
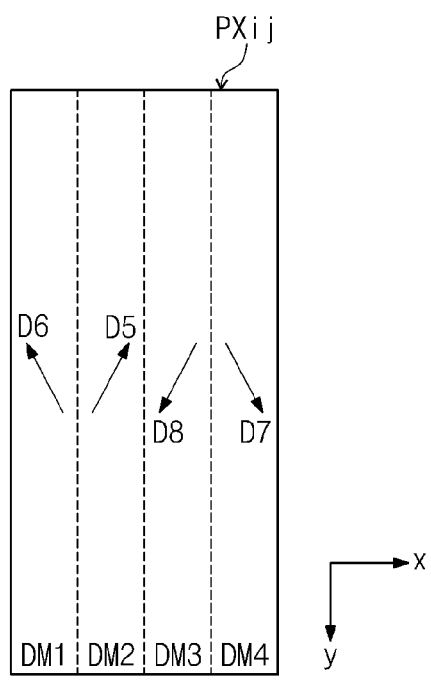

As shown in FIG. 7D, the first and fourth domains DM1 and DM4 of each pixel PXij may be configured to have photo-alignment directions, which are radially oriented from the center of the pixel region of each pixel PXij, and the second and third domains DM2 and DM3 may be configured to have photo-alignment directions, which are centripetally oriented toward the center of the pixel region of each pixel PXij.

According to the above exemplary embodiments, each pixel may have the first to fourth domains arranged in the form of a 2×2 matrix, but the inventive concept may not be limited thereto. For example, each pixel PXij may have first to fourth domains DM1, DM2, DM3, and DM4 arranged in the form of a 4×1 matrix or a 1×4 matrix. FIGS. 8A through 8D are plan views illustrating the photo-alignment directions of the first to fourth domains DM1, DM2, DM3, and DM4, when the first to fourth domains DM1, DM2, DM3, and DM4 of each pixel PXij are arranged in the form of the 4×1 matrix, and FIGS. 9A through 9D are plan views illustrating the photo-alignment directions of the first to fourth domains DM1, DM2, DM3, and DM4, when the first to fourth domains DM1, DM2, DM3, and DM4 of each pixel PXij are arranged in the form of the 1×4 matrix.

Referring to FIGS. 8A through 8D and 9A through 9D, each pixel may include a plurality of domains, which are provided to form various arrangements and have different photo-alignment directions from each other. Further, there may be various combinations of the photo-alignment directions in each pixel. For example, each pixel may have a circulation-type pixel region, in which domains have clockwise or counterclockwise photo-alignment directions, or a radial-type pixel region, in which domains have photo-alignment directions oriented outward from or inward to a center of the pixel region, and in some embodiments, the circulation-type pixel regions and the radial-type pixel regions may be alternatingly disposed along the x- and/or y-directions. In other embodiments, each pixel may be configured to include a portion of the circulation-type pixel region and a portion of the radial-type pixel region.

Adjacent pixels may be configured in such a way that the domains thereof have different arrangements from each other. For example, a (i, j)-th pixel may have the circulation-type pixel region, and a (i, j+1)-th pixel may have the pixel region, in which domains are arranged in the form of the 1×4 matrix.

In exemplary embodiments, the plurality of domains may be configured to have the same area, as shown in the drawings, but exemplary embodiments of the inventive concepts may not be limited thereto. At least two of the domains may be configured to have different areas from each other.

In exemplary embodiments, as described above, each pixel may be configured to have the plurality of domains with different alignment directions, but in other exemplary embodiments, the inventive concept may be applied to a region between the pixels or beyond each pixel. For example, in the case where four pixels constitute a unit pixel, each of the pixels may serve as a unit domain.

Figure 10:
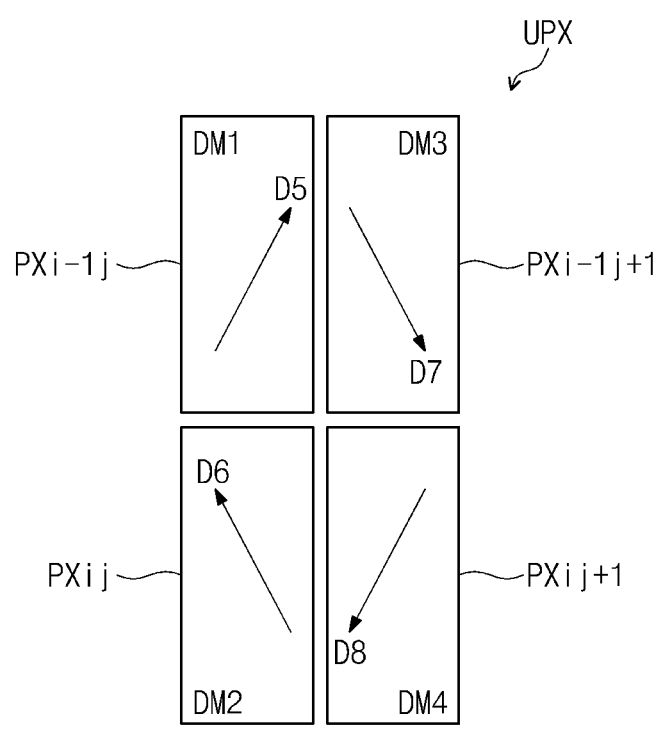
FIG. 10 is a plan view illustrating photo-alignment directions of first to fourth domains according to yet other exemplary embodiments of the inventive concept.

FIG. 10 is a plan view illustrating the photo-alignment directions of the first to fourth domains DM1, DM2, DM3, and DM4 according to yet other exemplary embodiments of the inventive concept. In the curved display device according to yet other exemplary embodiments of the inventive concept, four pixels PXi−1j, PXi−1j+1, PXij, and PXij+1 may be arranged in the form of the 2×2 matrix to constitute a unit pixel UPX.

Referring to FIG. 10, a (i−1, j)-th pixel PXi−1j, a (i−1, j+1)-th pixel PXi−1j+1, a (i, j)-th pixel PXij, and a (i, j+1)-th pixel PXij+1 may constitute the unit pixel UPX, the (i−1, j)-th pixel PXi−1j, the (i−1, j+1)-th pixel PXi−1j+1, the (i, j)-th pixel PXij, and the (i, j+1)-th pixel PXij+1 may be used as first to fourth domains DM1, DM2, DM3, and DM4, whose photo-alignment directions are different from each other. In the unit pixel UPX, the photo-alignment directions of the first to fourth domains DM1, DM2, DM3, and DM4 may be arranged in the same manner as those in one of the afore-described embodiments.

Figure 11:
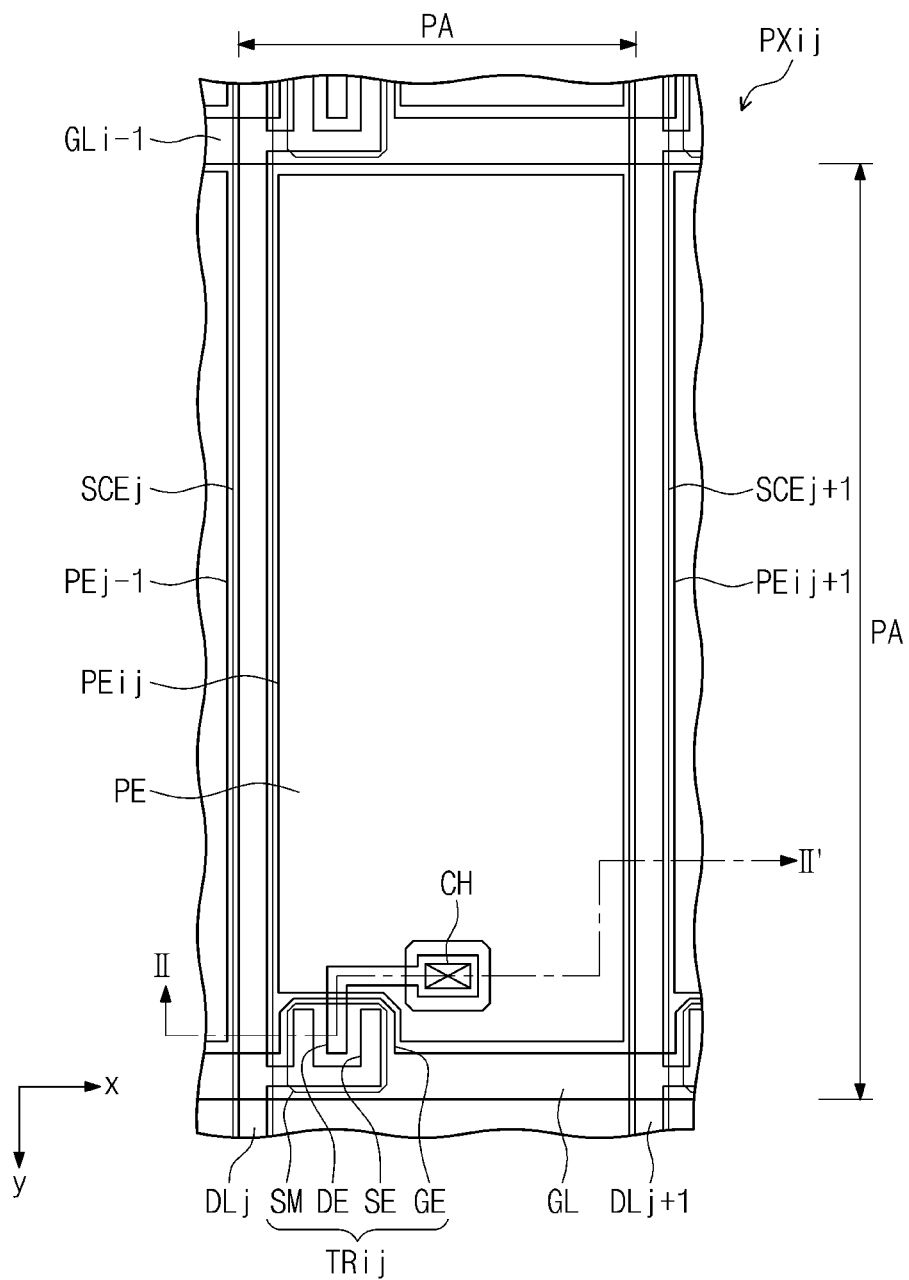
FIG. 11 is a plan view of a first substrate according to other exemplary embodiments of the inventive concept.
Figure 12:
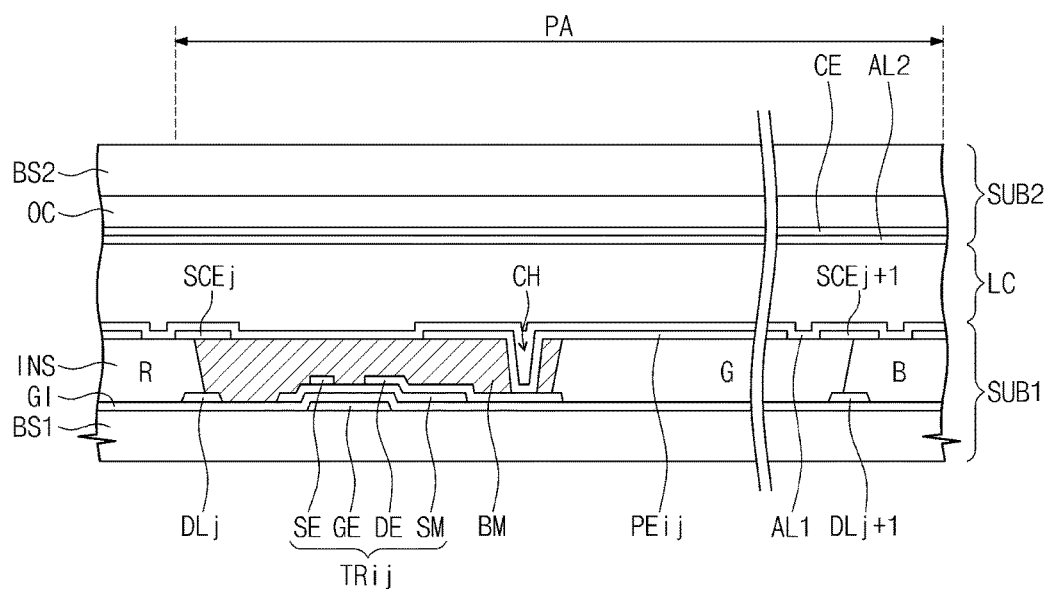
FIG. 12 is a sectional view taken along a line II-II' of FIG. 11.

According to exemplary embodiments of the inventive concept, the structure of the curved display device may be variously modified. FIG. 11 is a plan view of a first substrate SUB1 according to other exemplary embodiments of the inventive concept, and FIG. 12 is a sectional view taken along a line II-II' of FIG. 11. In the description that follows, a discussion of features identical to those of FIGS. 2 and 3 will be minimized in order to avoid redundancy.

Referring to FIGS. 11 and 12, the first substrate SUB1 may further include shielding electrodes SCE, each of which is provided between a corresponding pair of pixel electrodes adjacent to each other. For example, a first shielding electrode SCEj may be provided between a (i, j)-th pixel electrode PEij and a (i, j−1)-th pixel electrode PEij−1, and a second shielding electrode SCEj+1 may be provided between the (i, j)-th pixel electrode PEij and a (i, j+1)-th pixel electrode PEij+1.

The first and second shielding electrodes SCEj and SCEj+1 may be formed parallel to the first and second data lines DLj and DLj+1, respectively. When viewed in a plan view, the first and second shielding electrodes SCEj and SCEj+1 may have a width that is equal to or greater than that of the first and second data lines DLj and DLj+1, and may be disposed to cover the first and second data lines DLj and DLj+1, respectively.

The first shielding electrode SCEj may be electrically separated from the pixel electrode PEij and the left pixel electrode PEij−1. The second shielding electrode SCEj+1 may be electrically separated from the pixel electrode PEij and the right pixel electrode PEij+1.

In exemplary embodiments, the same voltage as the common voltage for the common electrode CE may be applied to first and second shielding electrodes SCEj and SCEj+1. Accordingly, no electric field is produced between the first shielding electrode SCEj and the common electrode CE or between the second shielding electrode SCEj+1 and the common electrode CE. In the case where the liquid crystal layer LC is formed of liquid crystal molecules with negative dielectric anisotropy, the liquid crystal molecules may be aligned to be vertical to a surface of the second shielding electrode SCEj+1, even in the state of no electric field. In this case, light provided from the backlight assembly may be blocked by the vertically-aligned liquid crystal molecules. Accordingly, the regions on which the first and second shielding electrodes SCEj and SCEj+1 are provided may serve as a light-blocking region of preventing the light from propagating therethrough. Because, as described above, the first and second shielding electrodes SCEj and SCEj+1 have an elongated shape parallel to the first and second data lines DLj and DLj+1, the light-blocking region may be formed parallel to the second direction D2 in FIG. 4A. The black matrix BM may not be provided on regions of the second substrate SUB2 facing the first and second shielding electrodes SCEj and SCEj+1.

If not only the pixel electrode PEij but also the first and second shielding electrodes SCEj and SCEj+1 are formed on the first substrate SUB1, it is possible to prevent light leakage or a dark region from occurring on the first and second data lines DLj and DLj+1.

According to exemplary embodiments of the inventive concept, a high-quality curved display device is disclosed that is configured to reduce defects resulting from misalignment.

Exemplary embodiments also disclose a method of fabricating a high-quality curved display device configured to reduce defects that may result from misalignment.

In summary, the exposing of the alignment material may include performing a first exposure step in a first exposure dose and then performing a second exposure step in a second exposure dose that may be equal to or lower than the first exposure dose, and a ratio of the first exposure dose to the second exposure dose ranges from 1:1 to 5:1.

In exemplary embodiments as described above, the first alignment layer may include the plurality of domains having different alignment directions, and the second alignment layer may be configured to realize the vertical alignment, but the present invention is not limited thereto. For example, the second alignment layer may include a plurality of domains having different alignment directions, and the first alignment layer may be configured to realize the vertical alignment. Further, according to exemplary embodiments as described above, each pixel or the unit pixel may be configured to have four domains, but, in other exemplary embodiments, the number of domains constituting each pixel or the unit pixel may be greater than or less than four.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A curved display device comprising a plurality of pixels and being bent in a first direction crossing a second direction, the curved display device comprising:
   a first substrate comprising a first base substrate, a pixel electrode disposed on the first base substrate, and a first alignment layer disposed on the pixel electrode, the first alignment layer comprising at least two domains having different photo-alignment directions;
   a second substrate comprising a second base substrate facing the first base substrate, a common electrode disposed on the second base substrate, and a second alignment layer disposed on the common electrode, the second alignment layer having a vertical alignment direction and no domains having different photo-alignment directions; and
   a liquid crystal layer comprising liquid crystal molecules interposed between the first and second substrates,
   wherein:
   a first angle and second angle represent pretilt angles relative to the first and second alignment layers, respectively;
   the first angle is smaller than the second angle; and
   a difference between the first angle and the second angle is in a range of 0.8° to 1.5°.

2. The device of claim 1, wherein the first alignment layer comprises:
   a first domain photo-aligned in a third direction;
   a second domain photo-aligned in a fourth direction that is different from the third direction;
   a third domain photo-aligned in a fifth direction that is different from the third and fourth directions; and
   a fourth domain photo-aligned in a sixth direction that is different from the second to fifth directions.

3. The device of claim 2, wherein the third to sixth directions are oblique to the first direction and the second direction when viewed in a plan view.

4. The device of claim 2, wherein the first to fourth domains are arranged in a 2×2 matrix.

5. The device of claim 2, wherein each pixel comprises the first to fourth domains.

6. The device of claim 5, wherein the first to fourth domains in two adjacent pixels are arranged in different orders.

7. The device of claim 2, wherein:
   adjacent four pixels constitute a pixel unit; and
   the first to fourth domains correspond to each of the adjacent four pixels, respectively.

8. The device of claim 7, wherein an arrangement order of the first to fourth domains are different from each other in adjacent two unit pixels.

9. The device of claim 1, wherein the first substrate further comprises:
   a plurality of signal lines disposed on the first base substrate; and
   a shielding electrode disposed along one of the plurality of signal lines that is parallel to the second direction and electrically separated from the pixel electrode.

10. The device of claim 9, wherein the shielding electrode is configured to receive a voltage having the same potential as that of the common electrode.

11. The device of claim 9, wherein the signal lines comprises:
    gate lines extending in the first direction; and
    data lines extending along the second direction,
    wherein the shielding electrode extends along the data lines.

12. The device of claim 11, wherein, when viewed in a plan view, the shielding electrode has a width equal to or greater than a width of one of the data lines.

13. The device of claim 11, wherein the second substrate further comprises a black matrix disposed on the second base substrate and extended along the gate lines.

14. The device of claim 1, wherein the first angle is in a range of 88.3° to 89.2°.

15. The device of claim 14, wherein the second angle is in a range of 89.8° to 90°.

* * * * *